Dec. 11, 1962     H. MULCH     3,067,535
PROJECTOR

Filed March 25, 1960     6 Sheets-Sheet 1

INVENTOR:
HANS MULCH

By Toulmin & Toulmin

Attorneys

Dec. 11, 1962   H. MULCH   3,067,535
PROJECTOR

Filed March 25, 1960   6 Sheets-Sheet 2

INVENTOR:
HANS MULCH

By Toulmin & Toulmin
Attorneys

INVENTOR
HANS MULCH
BY Toulmin & Toulmin
ATTORNEYS

Dec. 11, 1962  H. MULCH  3,067,535
PROJECTOR

Filed March 25, 1960  6 Sheets-Sheet 4

INVENTOR
HANS MULCH
BY Toulmin & Toulmin

ATTORNEYS

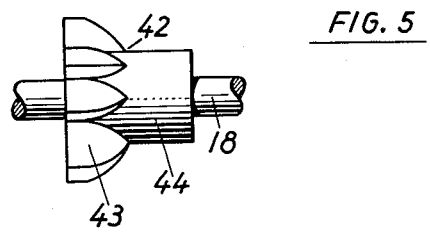
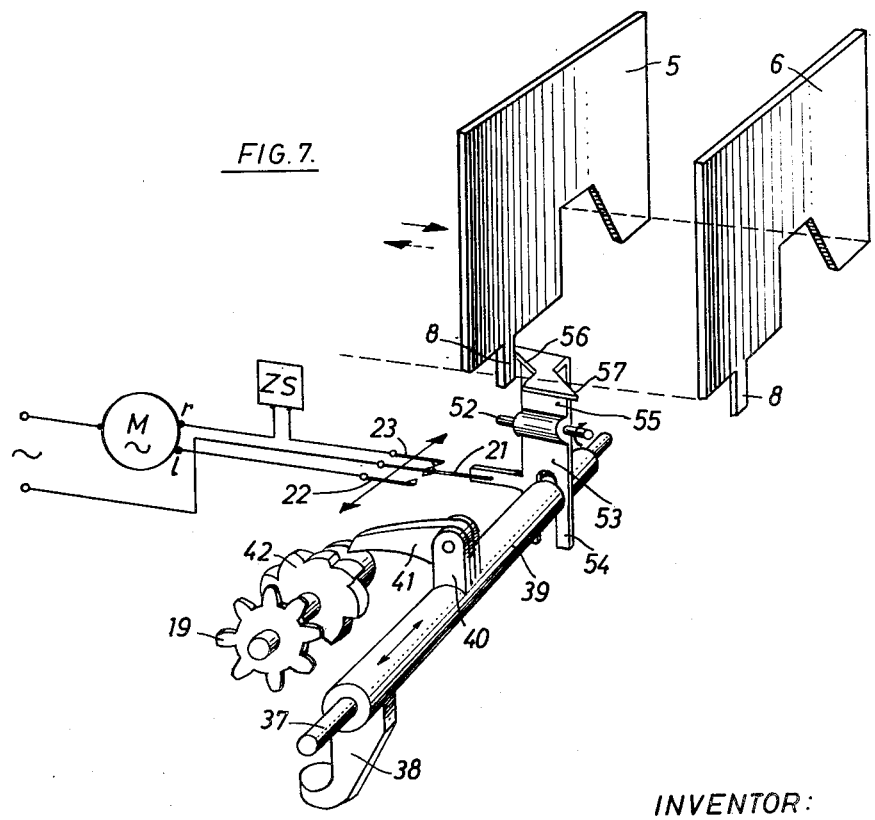

Dec. 11, 1962     H. MULCH     3,067,535
PROJECTOR

Filed March 25, 1960     6 Sheets-Sheet 6

INVENTOR:
HANS MULCH

By Toulmin & Toulmin
Attorneys

United States Patent Office 3,067,535
Patented Dec. 11, 1962

3,067,535
PROJECTOR
Hans Mulch, Wetzlar (Lahn), Germany, assignor to Ernst Leitz Gesellschaft mit beschrankter Haftung, Wetzlar (Lahn), Germany
Filed Mar. 25, 1960, Ser. No. 17,655
Claims priority, application Germany Mar. 28, 1959
6 Claims. (Cl. 40—79)

The present invention relates to a projector for slides. More in particular the present invention relates to a projector for continuously and repeatedly showing a series of slides provided in a magazine.

It is known in the art to provide a projector suitable for the continuous and repeated showing of a series of slides disposed in a magazine having a plurality of compartments. The slides are so stored in the magazine that the first part of the series is placed into the compartments with one compartment being left free from each slide, and then the second part of the series of slides is placed in the opposite direction into the free compartments. The magazine is moved by a step-switching mechanism, first in one direction and then in the opposite direction, by steps covering a distance of the width of two slides each. When reversing the direction of moving, the magazine must be advanced by one step covering the distance of the width of one slide in order to avoid an interval in the showing of slides between the first part and the second part of the series. For that purpose, the known projector has fixed stop members at the ends of the conveying rack of the magazine cooperating with the step-switching mechanism. At the same time the conveying means must be switched from reversing the advancing movement to a return movement. The control means required therefor, must be provided at a distance form each other determined by the length of the magazine and its rack, in order to prevent intervals in the showing of the slides. As a consequence, this known projector is suitable only for the continuous and repeated showing of a series of slides comprising a number of slides corresponding exactly to the number of compartments in the magazine; a smaller number of slides would be shown with intervals due to the empty compartments in the magazine.

It has also been proposed to provide a projector with a magazine wherein the slides are stored in the usual sequence. The magazine is advanced stepwise by the distance corresponding to the width of one compartment, and at the end it is quickly returned by a return mechanism to its initial position. This projector suffers from the same disadvantage as the previously described known projector. It is not possible to project without intervals a number of slides smaller than the number of compartments in the magazine.

With the foregoing in mind it is the object of the present invention to provide a projector for continuously and repeatedly showing a series of slides which makes it possible to show a number of slides smaller than the number of compartments in the magazine of the projector without interruption.

This object is achieved by the present invention according to which the projector has a magazine with a plurality of compartments with each compartment receiving a slide, means for moving the magazine in one direction in increments corresponding to the distance between two compartments, means for returning the magazine to the starting position, when the series of slides have been shown, and means for adjusting the distance of the movement of the magazine. By the last-mentioned means the distance covered by the magazine is reducd when a smaller number of slides is stored in the magazine and these slides can thus be shown without interruption due to the unused compartments in the magazine.

The last-mentioned adjusting means can consist, for example, of a pair of end plates which can be inserted into the magazine at any desirable location at either end of the series of slides and cooperating with a reversing switch. The plates are introduced into the magazine only after the latter has been placed on its guideway so that the reversing switch is disposed between the end plates and can be operated by the latter. The end plates have stop surface portions which can project either laterally or below or above the compartment walls and slides in the magazine.

In order to avoid any interference of the guide means of the magazine, the bottom plate of the magazine advantageously has a longitudinally extending groove into which project the stop surface portions of the end plates and the reversing switch, with the slides not projecting into these grooves.

It is also possible to provide instead of two separate end plates just one end plate for insertion into the magazine the other end plate being constituted by one of the front walls of the magazine The control means for adjusting the distance of the movement of the magazine can also consist of a pair of fixed stop members mounted on the magazine, a fixed rail extending parallel relative to the longitudinal extension of the magazine and a pair of reversing switches slideably mounted on the fixed rail between the stop members and operated by the latter. The reversing switches are coupled with one another by mechanical or electric means in order to assure that means for advancing the magazine in one direction are put out of operation simultaneously when reversing the direction of movement of the magazine. It is also possible to provide two adjustable and displaceable stop members mounted on a common support member cooperating with a reversing switch.

If the magazine is moved by an electric motor with an electric motor circuit the reversing switches are preferably provided in this electric circuit.

During the return of the magazine the means for advancing the slides, for example the slide pusher conveying mechanism, must be put out of operation, for example, by a coupling which, according to the invention, is operated by the reversing switches or the end plates either directly or via an electric control member such as, for instance, a lifting magnet.

Furthermore, it is possible to provide two separate electric motors, one motor for advancing the magazine and another one for returning the magazine. It is, however, also possible to provide only one electric motor which is of the reversible type and which can be operated clockwise as well as counter-clockwise. Furthermore, it is possible to provide an electric motor for advancing the magazine and a spring mechanism for returning the magazine. The movement of the magazine as well as the slide exchange can be initiated by one single switch means, for example a manually operated switch, or a time switching mechanism known per se and operating in a known manner. It is also possible to provide a tape-recorder connected with the time switch in a known manner and transmitting to the latter synchronized signals.

The invention will be further described with reference to the accompanying drawings, wherein:

FIGURE 5 is an elevational view of the switch element of the step switching mechanism illustrated in FIGURES 4 and 4a;

FIGURE 6 is a partial sectional view of a part of the driving elements in the step switching mechanism of FIGURES 4 and 4a;

FIGURE 7 is a perspective view of a step switching mechanism controlled by the end plate-reversing switch means according to the invention;

Figure 1:
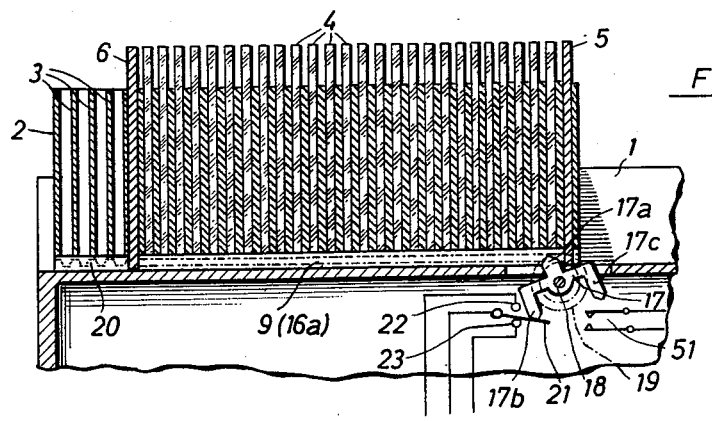
FIGURE 1 is a sectional view of a magazine in a projector according to the invention having two removeable end plates, cooperating with a reversing switch.
Figure 2:
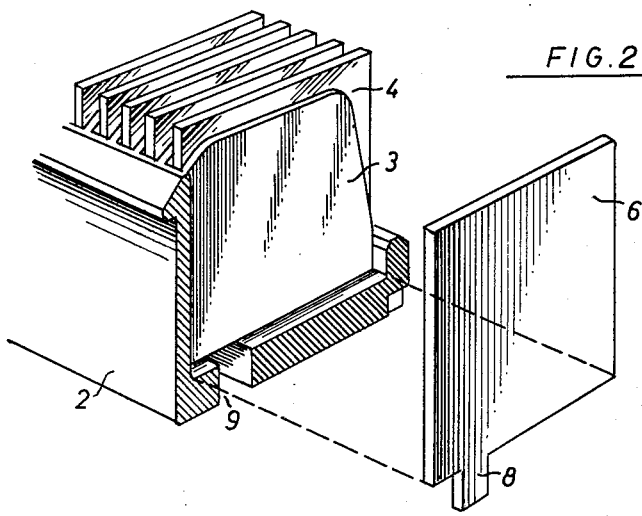
FIGURE 2 is a fragmentary perspective view of a magazine with an end plate according to the invention.

Referring now to the drawings more in detail, the projector is provided with a guideway 1 for magazine 2. The magazine 2 has compartment walls 3 between which the slides 4 are inserted. The magazine as shown in FIGURE 1 can receive a total of thirty-two slides. In the example shown in the drawings, however, only twenty-six slides form one series and are limited at either side by end plates 5 and 6. The slides rest on the bottom of the magazine, whereas the plates have a projecting tongue portion 8 protruding into a recess 9 in the bottom of magazine 2, as shown in FIGURE 2. The projecting tongue portions are so dimensioned that they do not protrude from the bottom of the magazine.

Figure 3:
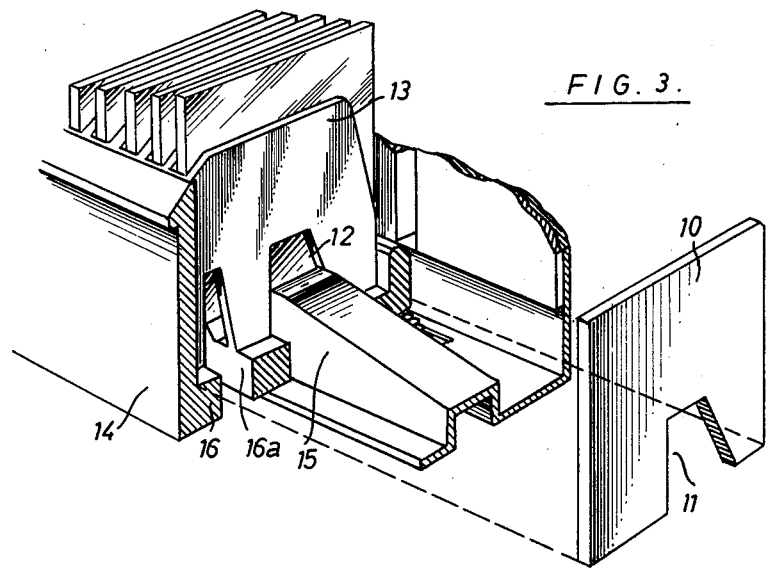
FIGURE 3 is a fragmentary perspective view of another embodiment of the magazine with another end plate according to the invention.

According to the embodiment shown in FIGURE 3 the end plates 10 have recesses 11 and corresponding recesses 12 are provided in the compartment walls 13 of the magazine 14. As soon as the slides in the magazine come within the range of the lifting means 15 they are lifted, whereas the plates 10 are not lifted and remain in the same plane; the end plates 10 thus remain on the bottom plate of the magazine and then have a stop surface portion projecting from the lower rims of the slides. The stop surface portions are accessible from below through a recess 16a in the bottom plate 16 and in the compartment walls 13.

A reversing switch 17 projects into recess 9 or recess 16a, respectively, and has a switch lever 17a disposed within the range of the stop surface portions of plates 10, or 5, 6, respectively. The reversing switch is mounted on a shaft 18 which latter supports gear or pinion 19 meshing with rack 20 of magazine 2. A second arm 17b of reversing switch 17 is connected with a pivotable contact blade 21 adapted to come into contact with contacts 22, or 23, respectively, according to the position of reversing switch 17. Contact 22 is connected with terminal 26b via lead 22a, the terminal being connected with time switch 26 via a first branch lead 26c, and with the moveable contact blade 33b of a micro-switch 33 via another branch lead 33g. Contact 23 is connected with the contact blade 26d of time switch 26 via a lead 23a. Pivotable contact blade 21 between contacts 22 and 23 is connected with one pole of current source 25a via lead 21a. The other pole of current source 25a is connected with a motor 24 via lead 25a and main switch 25b. The motor 24 is of the reversible type and can be operated to turn either clockwise or counter-clockwise. The motor is connected with terminals 24a and 24c between which there is provided a capacitor 24b. Terminal 24c is connected with contact 33c of micro-switch 33 via lead 33f. Furthermore, terminal 24c is connected with contact 34c of micro-switch 34a via lead 34e. Terminal 24a is connected with a branch-off 33g via lead 25c. Branch-off 33g is connected with contact 33a of switch 33 via lead 33e, and with contact 34d of micro-switch 34a via lead 25d. The moveable contact blade 34b is connected with time switch 26 via lead 26a.

Figure 6:
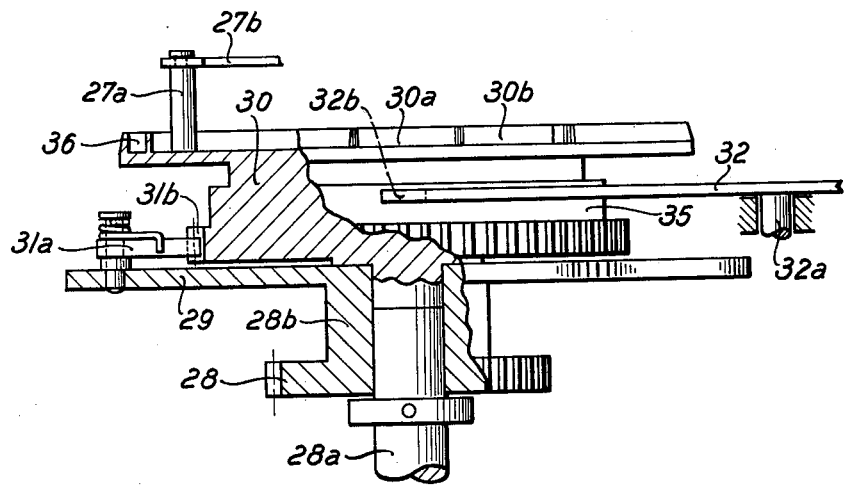

Motor 24 has a shaft 24d supporting gear 24e which latter meshes with a further gear 28. Gear 28 is rotatably mounted on a shaft 28a and is fixedly connected, via a hub 28b, with a cam disk 29 having a cam 29a. Shaft 28a also rotatably supports another gear 31b which latter is connected with cam disk 29 via a free wheeling coupling. The latter has a coupling element and, as shown in FIGURES 4 and 6, a pawl 31a influenced by spring 31c and adapted to engage gear 31b.

A disk 35 and another disk 30, superimposed on the latter, are fixedly connected with gear 31b. The two disks 35 and 30 are rotatable in one sense only, this being indicated by arrow A. Disk 35 has a recess 35a adapted to receive a feeling lever 32b of a two-armed lever 32 scanning the rim of disk 35. Two-armed lever 32 is mounted on shaft 32a; at its end opposite to feeling lever 32b it has a tongue portion 32c cooperating with resilient contact 49b of a switch 49. Contact 49b is connected with contact 51a of a switch 51 via lead 51c. The fixed contact 49a of switch 49 is connected with a lifting magnet 50 via lead 50b. Magnet 50 is supplied with current by current source 50a via switches 49 and 51, one pole of the current source 50a being connected with the magnet via lead 50c. The other pole of the current source 50a is connected with contact 51b of switch 51 via lead 51d. Contact 51b is disposed in the range of the third arm 17c of revering switch 17.

Figure 4:
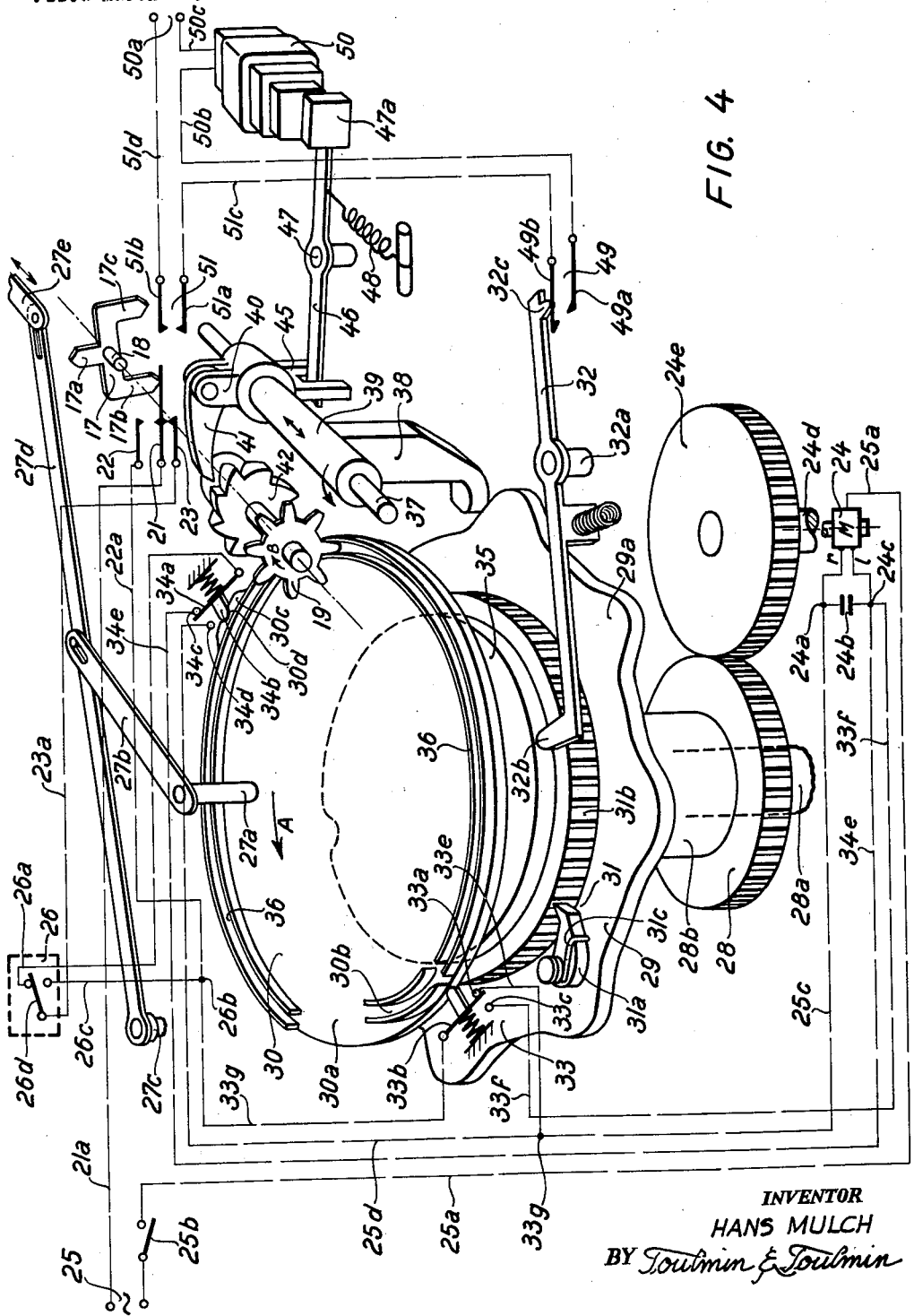
FIGURE 4 is a perspective view of a step switching mechanism for moving the magazine driven by a reversible motor and wherein the driving means for the slide pusher can be switched off as by reversing the switch cooperating with end plates as shown in FIGURE 1.
Figure 4A:
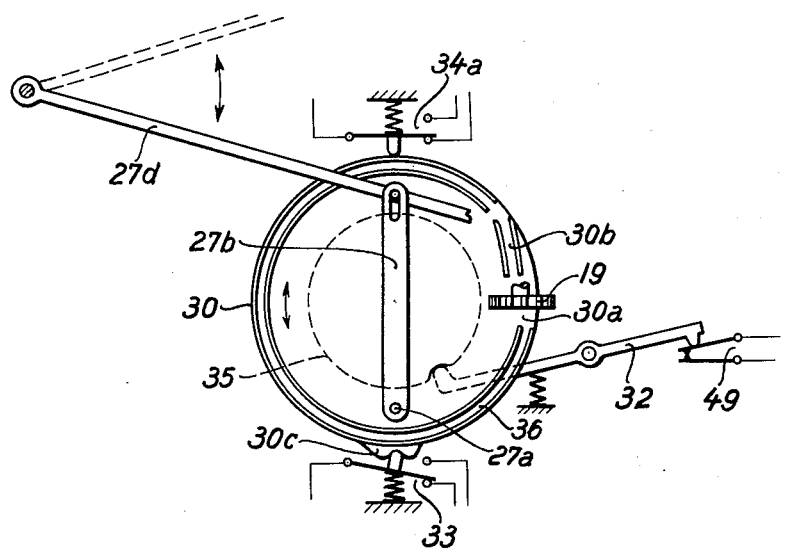
FIGURE 4a is a schematic view illustrating the step switching mechanism of FIGURE 4 in another position.

As shown in FIGURES 4 and 4a a bolt 27a is mounted on disk 30 and pivotably supports lever arm 27b. A further lever 27d, pivotable about shaft 27c, is pivotably connected with lever arm 27b and is moved by the latter. Lever 27d has an end portion protruding beyond the pivotable connection with lever 27b and this end portion is pivotably connected with a switch element 27e which latter is connected with the slide pusher for changing the slides by known structure and in a known manner.

Disk 30 bears a curved control member 30b adapted to mesh with gear 19 and to step-switch the same at each full revolution of disk 30 in a direction indicated by arrow b. Furthermore, there is provided a guide 36 securing gear 19 during most of one full revolution of disk 30 in its respective position. The movement of gear 19 is, however, enabled by the recess portion 30a, in a determined position of disk 30, wherein gear 19 is in the range of this recess, as will be easily apparent from FIGURE 4.

Disk 30 furthermore supports an elongated cam 30c having an indent 30d. This cam 30c operates micro-switches 33 and 34a by alternatingly actuating contacts 33b and 34b.

Cams 29a of cam disk 29 are connected with a scanning lever 38 mounted on shaft 37. Scanning lever 38 has a sleeve 39 slideable on shaft 37 and forming a bearing, as at 40, for a pawl 41. Pawl 41 cooperates with a switch element 42 having a gear 43 the teeth of which are laterally slanted in the direction towards hub 44 having a smooth cylindrical mantle (see FIGURE 5). The point of pawl 41 can thus easily be moved from the smooth surface of the hub into the toothed surface of gear 43 whenever sleeve 39 is placed on shaft 37. Switch element 42 is mounted on the same shaft supporting gear 19, that is on shaft 18. Sleeve 39 also supports a fork-shaped member 45 engaged by a switch lever 46 pivotable about shaft 47 and actuated by spring 48. At one of its ends lever 46 bears the armature 47a of the electrical lifting magnet 50.

The afore-described structure operates in the following manner: The slides are inserted into magazine 2 and the magazine is placed on the guideway 1 of the projector and is advanced until reversing switch 17 is in the range of the series of slides. Thereafter, the end plates 5, 6 with the stop surface portions are inserted into the magazine on either ends of the series of slides and the main switch 25b is operated. According to the position of reversing switch 17 magazine 2 is then either advanced or moved back. If reversing switch 17 has the position shown in FIGURE 1, contacts 21, 23 are closed and circuit is established comprising and via the following, above-described elements: Current source 25, 21a, 21, 23, 23a, 26d, 26a, 34b, 34c, 34e 24c, 24, 25a, 25b. The motor turns leftwardly and drives only gear 28 and cam disk 29 over gear 24e. The scanning lever 38 is actuated and pawl 41 is moved, the latter, however, sliding over the smooth cylindrical portion 44 (FIG. 5) of switch element 42; consequently, there is no transmission to gear 19. Only after time switch 26 operates contact 26d, the motor 24 reverses its sense of operation and now turns in clockwise direction, thereby moving disks 35 and 30 in the direction indicated by arrow A. The circuit now comprises the following, above-described elements: Current source 25, 21a, 21, 23, 23a, 26d, 26c, 26b, 33g, 33b, 33a, 33e, 25c, 24a, 24, 25a, 25b. Leads 22a and 25a are not in circuit. The rotation of disk 30 moves levers 27b and 27d, thereby operating the slide pusher. In FIGURE 4 the slide is in projecting position and is removed from this position as soon as disk 30 starts to rotate. Gear 19 glides in guide 36 and is therefore not turned. Shortly after disk 30 has started to turn, cam 30c releases contact 34b which then comes into contact with contact 34d. If contact 26d of time switch 26 still is in touch with lead 26c the circuit is maintained. If, however, time switch 26 has returned contact 26d in a known manner to its initial position as shown in FIGURE 4, then the circuit is as follows: Current source 25, 21a, 21, 23, 23a, 26d, 26a, 34b, 34d, 25d, 33g, 25c, 24a, 24, 25a, 25b. After about half a revolution of disk 30, the curved control member 30b comes into the range of gear 19 and step-switches the same. Since gear 19 meshes with rack 20 of magazine 2, the latter is displaced by the width of one slide. During the engagement of gear 19 and curved control member 30b, switch element 27e has been moved so that the projected slide has been returned to the magazine. As soon as curved control member 30b leaves the range of gear 19, cam 30c actuates contact 33b of switch 33 and establishes contact with contact 33c. The clockwise rotation of the motor is, however, not interrupted. The circuit is now as follows: Current source 25, 21a, 21, 23, 23a, 26d, 26a, 34b, 34d, 25d, 33g, 25c, 24a, 24, 25a, 25b.

The position of micro-switches 33 and 34a relative to gear 19 and the position of cam 30c relative to recess 30a are so chosen that whenever micro-switch 33 is switched off, recess 30a is in the range of gear 19, as shown in FIGURE 4a. In addition, bolt 27a is so positioned that at the time of reversing of the sense of operation the respective end positions of the slide pusher (projecting position, magazine conveying position) are reached. When changing over contact 33b from contact 33a to contact 33c, recess 35a of disk 35 is directly in the range of feeling lever 32b of lever 32 so that the feeling lever 32b can enter recess 35a. During the movement of the latter, blade 32c closes contacts 49b and 49a of switch 49. As long as the contacts of switch 51 are not closed, the lifting magnet remains currentless, disk 30 continues to revolve in the direction of arrow A and gear 19 is again secured in guide 36 after having performed one step-switch operation. During the second part of the revolution of disk 30, element 27e performs a return movement and places a new slide into the projecting position in a known manner. After one full revolution of disk 30 the cam 30c again comes into contact with contact 34b, thereby interrupting the clockwise rotation of the motor.

Further rotation of disk 30 is prevented by a projecting portion at contact 34b projecting into indent 30d at the periphery of disk 30.

The afore-described operation is repeated at every switching operation of time switch 26, until end plate 6 comes into contact with arm 17a of reversing switch 17, thereby pivoting the same. As a consequence, contact 21 is changed from engagement with contact 23 to contact 22 and switch 51 is closed via arm 17c. This last-mentioned operation can be effected only if the magazine is in the process of being conveyed, which is the case whenever curved control member 30b is just passing or has just passed gear 19. Cam 30c is then immediately in front of contact 33 and, if it has not yet actuated the same, disk 30 continues to rotate in the direction indicated by arrow A, the motor continuing to turn clockwise. The circuit is then as follows: current source 25, 21a, 21, 22, 22a, 26b, 33g, 33b, 33a, 25c, 24a, 24, 25a, 25b.

Lead 26 is not in circuit in both positions of switch 26d. As soon as cam 30c contacts contact 33b, disk 30 is stopped and the circuit is now as follows: Current source 25, 21a, 21, 22, 22a, 26b, 33g, 33b, 33c, 33f, 24c, 24, 25a, 25b.

In the last-mentioned position feeling lever 32b projects into recess 35a as already described. Recess 35a is so positioned that lever 32 can enter the same only after cam 30c has reversed switch 33. This is necessary in order to prevent any untimely return step-switching of gear 19 (see FIGURE 4a). As soon as feeling lever 32b has entered recess 35a switch 45 is closed and since switch 51 is also closed, the lifting magnet 50 is supplied with current and armature 47a is attracted. Thereby lever 46 is pivoted and sleeve 39 displaced on shaft 37 until pawl 41 engages gear 42. By each stroke of lever 38, actuated by cams 29a gear 42 is switched by one step and since gear 42 is mounted on the shaft of gear 19, gear 42 is also step-switched although in reversed direction, thereby returning the magazine. In the example illustrated and described, cam disk 29 has eight cams 29a, causing eight strokes of lever 38 during each full revolution of cam disk 29. As a result, there are eight step-switching operations for the return of the magazine for only one step-switching operation for advancing the magazine and, consequently, the interval between the showing of the slide of a particular series and the projection of the first slide of the next-following series is kept rather short.

The return movement is ended as soon as the reversing switch 17 is reversed by plate 5, thereby initiating the advancing movement of the magazine and causing a new projection of the series of slides. Whereas in the embodiment shown in FIGURE 4 electromechanical means are used for operating pawl 41, purely mechanical means are employed according to another embodiment shown in FIGURE 7, wherein an actuating member 53 is pivotally mounted on shaft 52 and is connected with axially displaceable sleeve 39 via fork-shaped end portion 54. Member 53 also serves for actuating contact blade 21. Member 53 has an arm 55 with a bent portion with obliquely extending rims 56 and 57 disposed in the path of plates 5 and 6 with its downwardly projecting portion 8. The latter, when contacting rims 56 or 57 pivots member 53 forwardly or backwardly, thereby causing contacts 21, 23 and 21, 22 to become opened or closed, alternatingly. The coupling operation between pawl 41 and gear 42 is effected simultaneously through fork-shaped member 54. Apart from that the operation is entirely as described for the embodiment of FIGURE 4.

Figure 9:
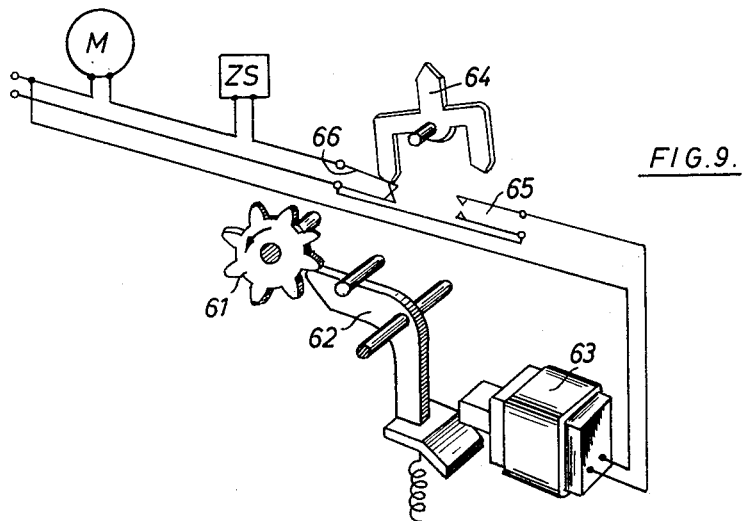
FIGURE 9 is a fragmentary perspective view of some of the elements shown in FIGURE 8.
Figure 8:
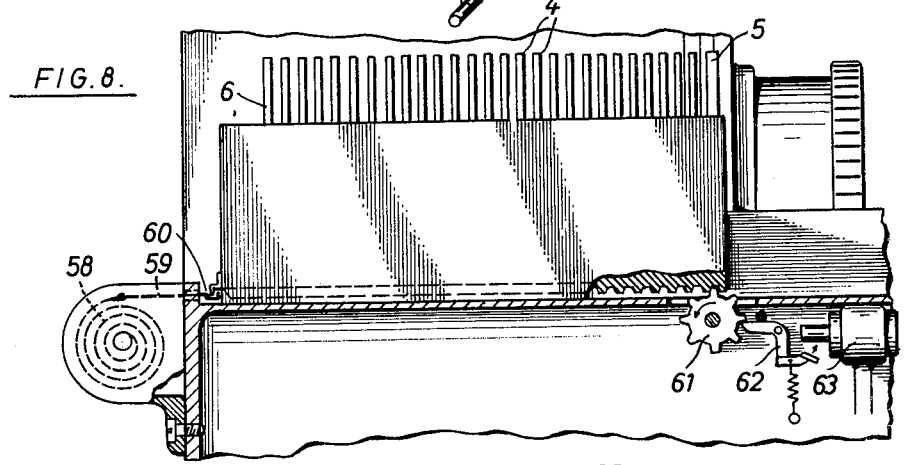
FIGURE 8 is a side view, partly in section, of a magazine returned by a spring mechanism.

According to another embodiment, illustrated in FIGURES 8 and 9, the return movement of the magazine is effected by means of a spring mechanism 58. The latter is connected with the magazine by a rope 59 and coupling elements 60. The magazine is advanced by an electric motor driving the drive gear 61 as in the previously described embodiments, however, without a free wheeling clutch. The driving energy must be sufficient so that, when advancing the magazine, spring 58 is tensioned. Associated with gear 61 there is provided a locking member 62 for retaining the same in position after each advance step switch. The locking member is unlocked by means of a lifting magnet 63 which can be connected to circuit via contacts 65 by switch 64. Switch 64 also actuates switch 66 in the motor circuit.

If switch 64 is moved from one stop plate to its return position the lifting magnet is supplied with current and unlocks locking member 62. Simultaneously switch 66 opens and interrupts the motor circuit. Consequently, gear 61 can turn freely and under the influence of spring 50 the magazine is returned until the second stop plate again operates the switch, thereby putting the motor in operation, whereupon the motor brakes the return movement and starts a new advancing movement of the magazine for the projection of a series of slides.

Figure 10:
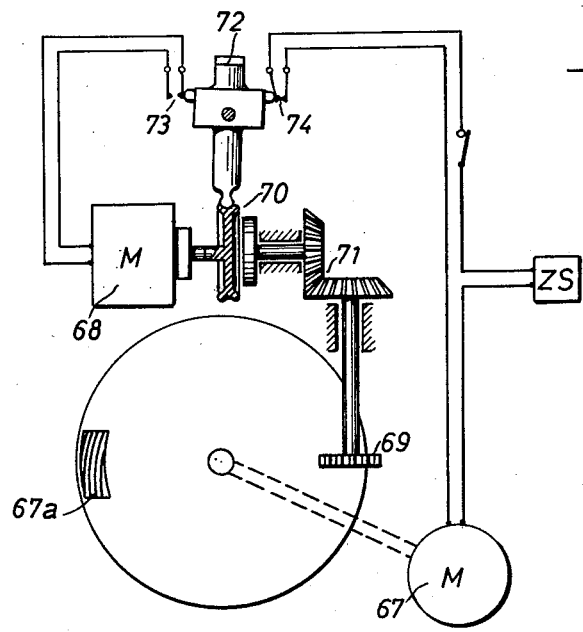
FIGURE 10 is a schematic view of a step switching mechanism operated by two motors and having coupling means operated by the reversing switch according to the invention.

It is also possible to provide, as illustrated in FIGURE 10, two separate motors 67 and 68, one motor being provided for the return movement and the other one for the advancing movement of the magazine. Between the return motor 68 and the drive gear 69 there is provided a gear 71 and a coupling 70 directly actuated by switch 72. Switch 72 is operated in the same manner as previously described by means of end plates 5, 6, not shown in FIGURE 10, thereby alternatingly switching in and switching off switches 63 and 64 for the motors 67 and 68. The advancing motor 67 is in driving connection with drive gear 69 via a control element 67a in the same manner as described with respect to FIGURE 4.

Figure 11:
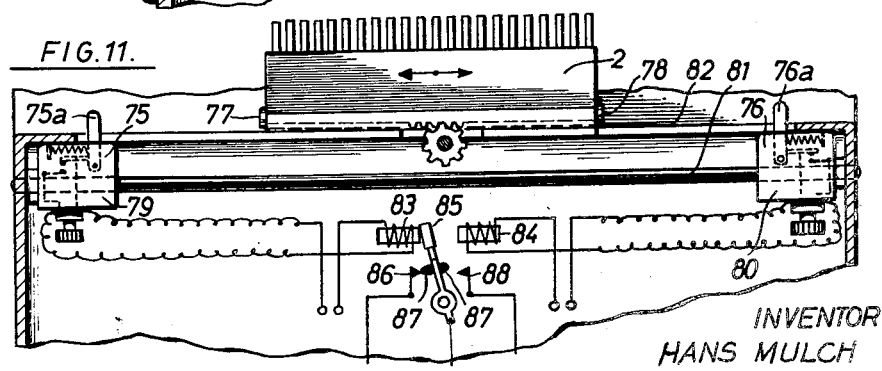
FIGURE 11 is a somewhat schematic side elevational view of a magazine with stop members fixedly attached thereto and a pair of moveable reversing switches.

In still another embodiment the control means for reversing the directions of movement of the magazine, illustrated in FIGURE 11, consist of two switches 75, 76 having operating arms 75a, 76a, positioned in the path of magazine 2 and cooperating with stop members 77, 78, fixedly connected with the magazine. The switches are provided on support members 79, 80 which are displaceable parallel relative to magazine guide 82 upon a fixed rail 81. Together with switches 75, 76 relays 83, 84 can be connected to circuit, moving an arm 85 either leftwardly or rightwardly, thereby short-circuiting contacts 86, 87 and 87, 88, respectively.

The circuit connection of contacts 86, 87, 88 is identical with that of contacts 21, 22, 23 in FIGURE 4 and therefore not described in detail.

It will be understood that this invention is susceptible to modification in order to adapt it to different usages and conditions and, accordingly, it is desired to comprehend such modifications within this invention as may fall within the scope of the appended claims.

What I claim is:

1. In a projector for continuously and repeatedly showing a series of slides, comprising a magazine having a plurality of compartments with each compartment receiving a slide; the combination of means for moving said magazine in one direction in increments corresponding to the distance between two of said slide compartments, means for returning the magazine to the starting postion when the series of slides have been shown, a pair of removable end plates each having a stop surface portion inserted into the compartments of said magazine to cause the adjustment of the distance of the movement of said magazine, and a reversing switch for controlling the direction of movement of said magazine, said reversing switch being disposed between said end plates and operated by the latter.

2. A projector according to claim 1, further comprising electric motor means and electric circuit means for advancing and returning said magazine, with said reversing switch being provided in said electric circuit means.

3. A projector according to claim 1, further comprising motor means, said means for moving said magazine comprising coupling means for engaging and disengaging said means for moving said magazine with said motor means, said coupling means being operated by said reversing switch.

4. A projector according to claim 1, further comprising motor means, said means for moving said magazine comprising coupling means for engaging and disengaging said means for moving said magazine with said motor means, a lifting magnet, said coupling means being operated by said reversing switch via said lifting magnet.

5. A projector according to claim 1, further comprising means for automatically putting out of operation said means for moving said magazine in one direction at the start of the return movement of said magazine.

6. In a projector for continuously and repeatedly showing a series of slides, comprising a magazine having a plurality of compartments with each compartment receiving a slide; the combination of electric motor means for moving said magazine in one direction in increments corresponding to the distance between two of said slide compartments, electric motor means for returning the magazine to the starting position when the series of slides have been shown, a pair of stop members on said magazine, and switching means extending in the path of movement of said stop members, said stop members and said switching means forming control means and engaging together for controlling the circuit of said motor means for moving the magazine, at least one of said control means being movable relative to the other one in a direction corresponding to the path of movement of said magazine for adjusting the distance of the movement of said magazine in both directions.

References Cited in the file of this patent

UNITED STATES PATENTS

| 2,401,506 | Pechkranz | June 4, 1946 |
| 2,748,653 | Pollan et al. | June 5, 1956 |
| 2,854,888 | Kaye | Oct. 7, 1958 |
| 2,907,128 | Norton | Oct. 6, 1959 |

FOREIGN PATENTS

| 493,832 | Germany | Mar. 13, 1930 |